W. E. HARWELL.
Band-Cutting Feeder for Thrashing-Machines.

No. 199,202. Patented Jan. 15, 1878.

WITNESSES:
Francis McArdle
J. H. Scarborough

INVENTOR:
W. E. Harwell.
BY Munn
ATTORNEYS.

UNITED STATES PATENT OFFICE.

WILLIAM E. HARWELL, OF STARRSVILLE, GEORGIA.

IMPROVEMENT IN BAND-CUTTING FEEDERS FOR THRASHING-MACHINES.

Specification forming part of Letters Patent No. 199,202, dated January 15, 1878; application filed September 29, 1877.

*To all whom it may concern:*

Figure 1:
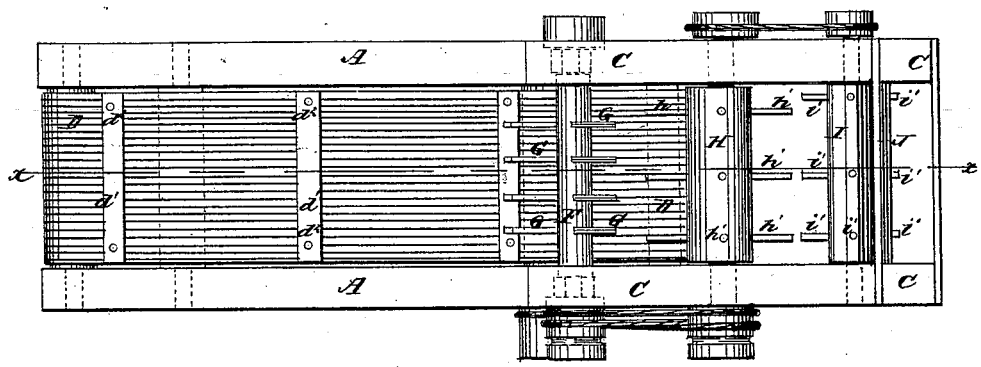
Figure 2:
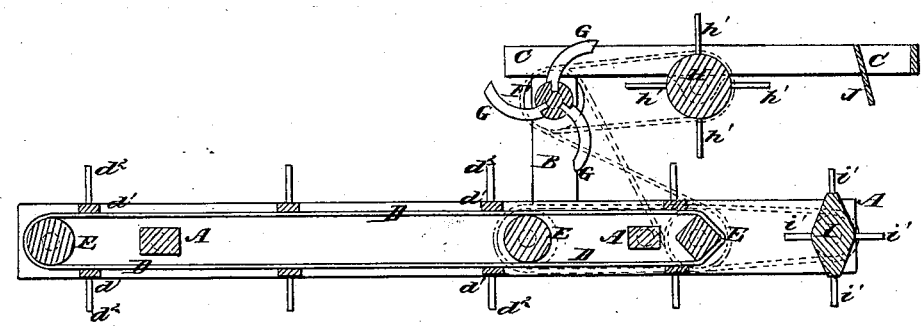

Be it known that I, WILLIAM E. HARWELL, of Starrsville, in the county of Newton and State of Georgia, have invented a new and useful Improvement in Feeder for Thrashers, of which the following is a specification:

Figure 1 is a top view of my improved device. Fig. 2 is a vertical longitudinal section of the same, taken through the line $xx$, Fig. 1.

Similar letters of reference indicate corresponding parts.

The object of this invention is to furnish an improved device for feeding grain to a thrasher, which shall be so constructed as to carry the grain forward, cut the bands, spread out the grain, and deliver it to the thrasher in proper condition to be operated upon, and which shall be simple in construction and reliable in operation.

The invention will first be described in connection with the drawing, and then pointed out in the claim.

A is a frame, which is designed to be supported by legs or a suitable frame-work directly in front of the thrasher.

To the side bars of the frame A, a little in the rear of its middle part, are attached the lower ends of two short standards, B, to the upper ends of which are attached the forward ends of the side bars of a frame, C, parallel with the rear part of the frame A, or nearly so, and projecting a little in the rear of said frame A.

D is an endless apron or carrier, which passes around rollers E, pivoted to the side bars of the frame A. To the endless apron D are attached cross-bars $d^1$, provided with pins or teeth $d^2$, to take hold of the grain and carry it forward.

To the upper part of the standards B is pivoted a shaft or drum, F, to which are attached knives G, which I prefer to make slightly curved, and which are designed to cut the bands of the bundles as they are being carried forward by the carrier D $d^1$ $d^2$.

To the side bars of the upper frame C, over the rear end of the carrier D $d^1$ $d^2$, is pivoted a cylinder or drum, H, which is provided with fingers or teeth $h'$; and to the rear ends of the side bars of the frame A, and in line with the carrying-belt D, is pivoted a diamond-shaped cylinder or drum, I, which is provided with fingers or teeth $i'$. The toothed cylinders or drums H I are designed to spread the grain, so that it may enter the thrasher in proper position to be thrashed.

To the rear part of the frame C, a little in the rear of the lower spreading-cylinder I $i'$, is attached an inclined board or apron, J, to guide the grain down into the thrasher.

Power is applied to the knife-cylinder F from the thrasher by a belt and pulleys, and from the knife-cylinder to the carrier and the toothed cylinders by belts and pulleys.

Having thus described my invention, I claim as new and desire to secure by Letters Patent—

The combination, with the toothed carrying-belt D and the rotating shaft F, carrying the band-cutting knives, arranged above said belt, of the rotary scattering and delivering rakes H I, arranged at the inner end of belt, respectively above and in line with it, as and for the purpose specified.

WILLIAM EARNEST HARWELL.

Witnesses:
THOMAS Y. GREGORY,
FRANCIS M. HAYS.